Figure 1:
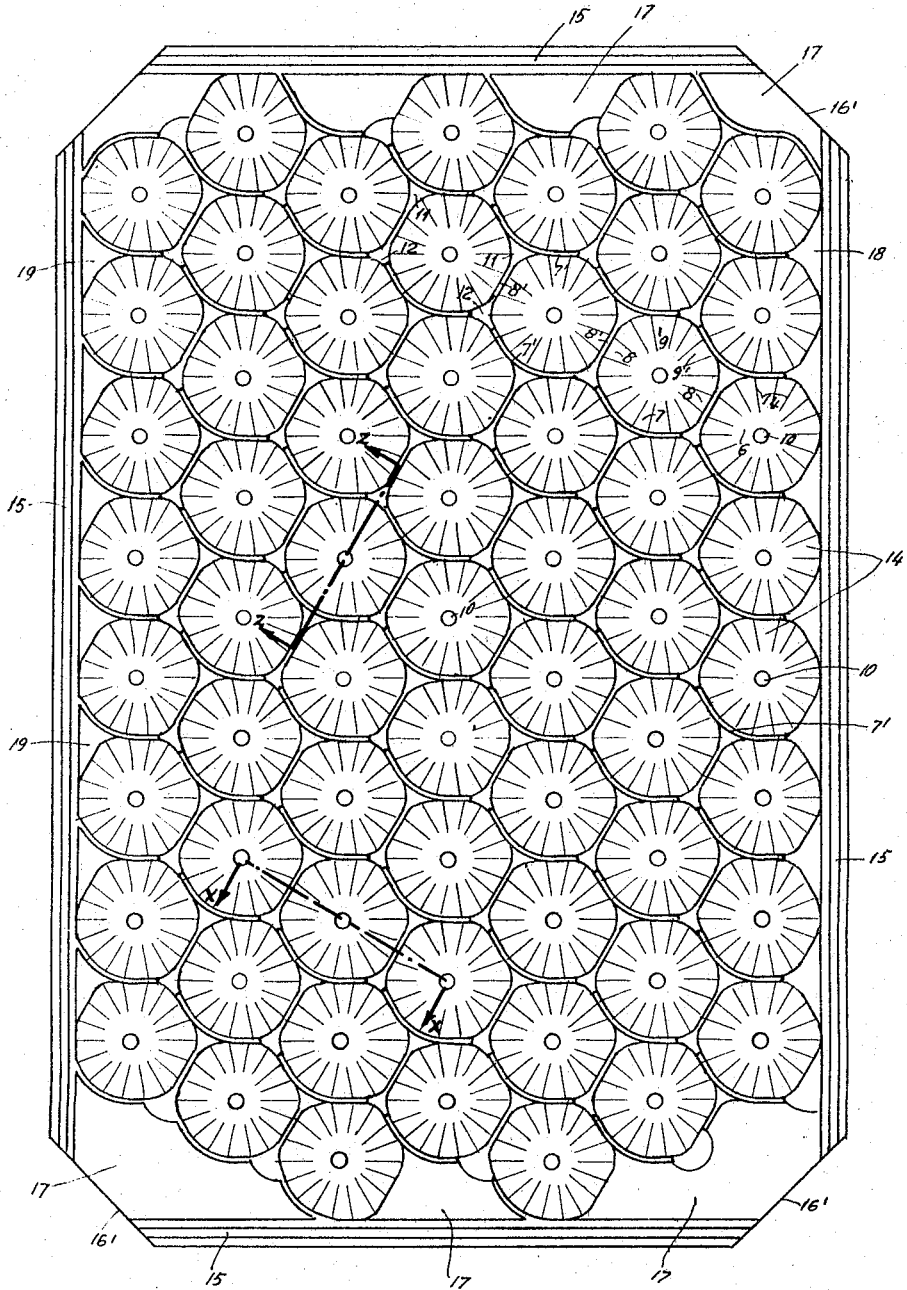

Feb. 28, 1967  P. PADOVANI  3,306,484
TRAY MADE OF THIN SHEETING WITH CAVITIES TO
RECEIVE FRUIT OR ROUND OBJECTS
Filed Nov. 30, 1964  4 Sheets-Sheet 1

INVENTOR
PIETRO PADOVANI
By Shoemaker and Mattare
ATTYS.

INVENTOR
PIETRO PADOVANI

INVENTOR
PIETRO PADOVANI
By Shoemaker and Mattare
ATTYS.

Feb. 28, 1967 P. PADOVANI 3,306,484
TRAY MADE OF THIN SHEETING WITH CAVITIES TO
RECEIVE FRUIT OR ROUND OBJECTS
Filed Nov. 30, 1964 4 Sheets-Sheet 4

INVENTOR
PIETRO PADOVANI
By Shoemaker and Mattar
Attys.

United States Patent Office 3,306,484
Patented Feb. 28, 1967

3,306,484
TRAY MADE OF THIN SHEETING WITH CAVITIES TO RECEIVE FRUIT OR ROUND OBJECTS
Pietro Padovani, Chievo, Verona, Italy, assignor to I.S.A.P., S.p.A, Chievo, Verona, Italy
Filed Nov. 30, 1964, Ser. No. 414,819
Claims priority, application Italy, Dec. 5, 1963, 25,285/63; Germany, Apr. 20, 1964, J 25,687
7 Claims. (Cl. 217—26.5)

The invention relates to a tray made of thin sheeting with offset rows of cup-like cavities to receive fruit or other round objects. The sheeting may, for example, be of thermoplastic material which can be mechanically and/or pneumatically shaped by a drawing or compressing operation or by a simultaneous drawing and compressing operation.

Trays of this type, which may be used for holding and keeping apart fruits to be despatched, are placed in a different container such as a wooden box. They often contain cup-like cavities separated by walls of sheeting folded over at different heights along their periphery. These walls extend at the top via hollow, frustoconical, frustopyramidal or similar bosses or crests of via saddle-like lower portions in the walls into the adjacent cavities. The ends of the bosses and/or the saddle-like portions are reinforced so as to hold the fruit with a strong—and therefore harmful—gripping pressure. In one embodiment of such a known tray at least two such saddle-like portions are provided in each cavity and are far enough below the widest portion of the fruit to enable fruit to be grasped easily and taken out. This means, however, that the saddles, which also constitute the dividing surfaces between the fruit, have to be comparatively wide in order that the fruits do not come into contact with each other. As a result the bosses and saddles take up a considerable part of the whole available surface, thus decreasing the number of fruits which a single tray can hold.

In another known embodiment hexagonal cavities are closely juxtaposed in offset rows. The sheeting has acute-angled folded edges extending without interruption from one side of the tray to the other. This gives the tray considerable flexibility in the directions of these edges, so that the gripping pressure on the fruit is only very weak. In this embodiment saddle-like depressions permitting a certain splaying-out of the continuous walls for removal of the fruit are provided thus introducing the further disadvantage of large bulk.

In a known embodiment of such a tray containing cavities no saddles are provided for taking out the fruit and the fruit is instead removed by exerting upward pressure on the bottom of the cavities. If the fruit is of the same size this construction makes it possible to accommodate approximately the same number of fruits as can be accommodated in a box without trays if wrapped, for example, in paper. However it has considerable disadvantages. For example, in order to replace a bad fruit in a cavity in the centre of the tray it is necessary to lift the tray out of the box, take out the bad fruit, replace it and then put the tray back in the box.

In the known trays mentioned above the vertical central axis of the fruit in the cavity coincides with the vertical central axis of the empty cavity, so that shaking caused by irregularities of the road surface during transport can be prevented only by strong gripping pressure exerted on the fruit by the side walls of the cavity or the ends of the bosses, which is harmful particularly if the fruit is ripe.

The invention aims to provide a tray with cavities capable of holding as many fruits as could be accommodated, wrapped in paper, in a box without a tray.

The tray must provide for easy removal of the fruit from the cavities and prevent any contact between the individual fruits in the cavities.

Another aim of the invention is to prevent the fruit in the cavities from being shaken without having recourse to exerting strong gripping pressure on the fruit, since strong pressure is harmful if the fruit is ripe.

Figure 2:
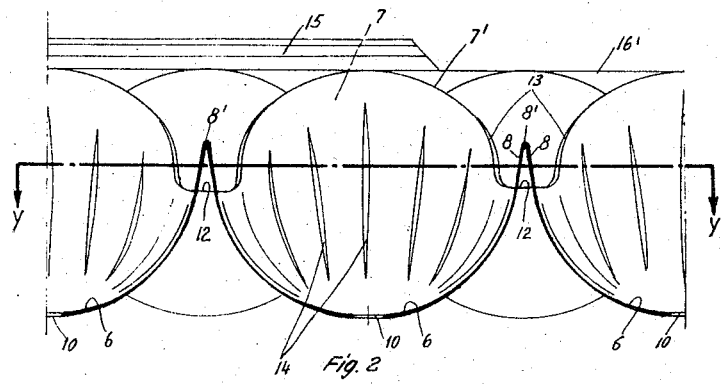
Figure 3:
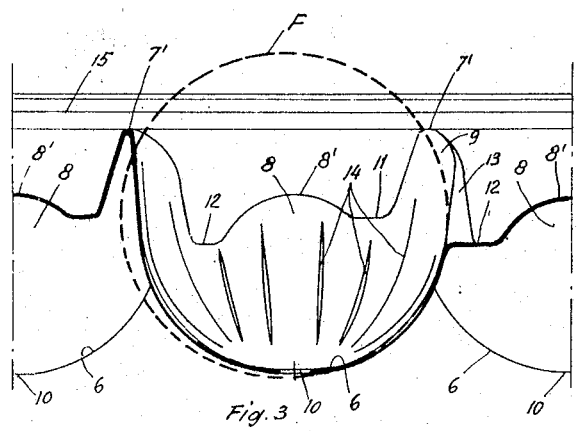
Figure 4:
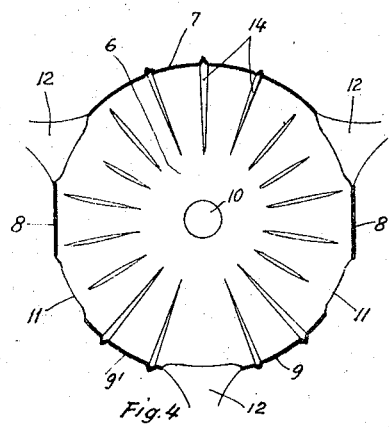
Figure 5:
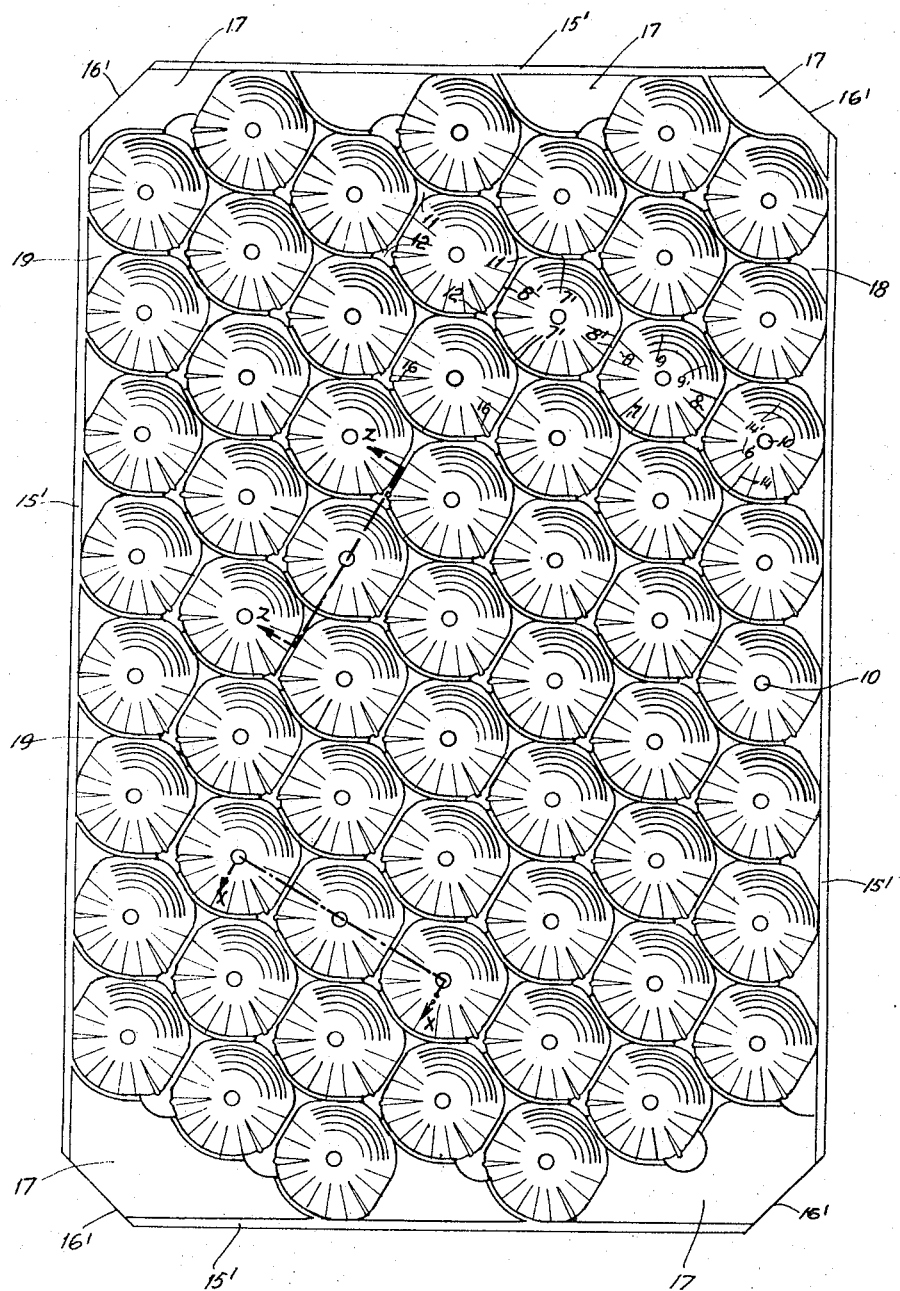
Figure 6:
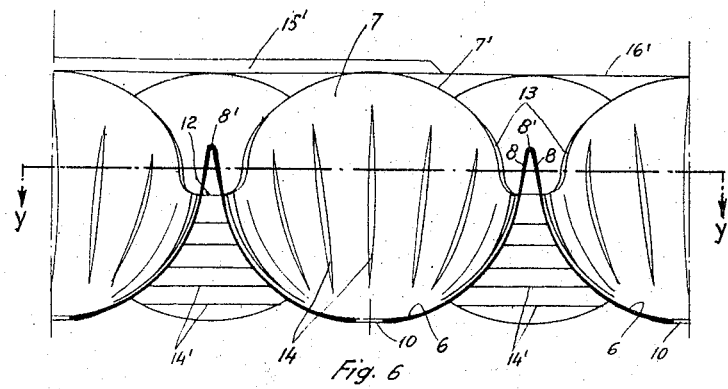
Figure 7:
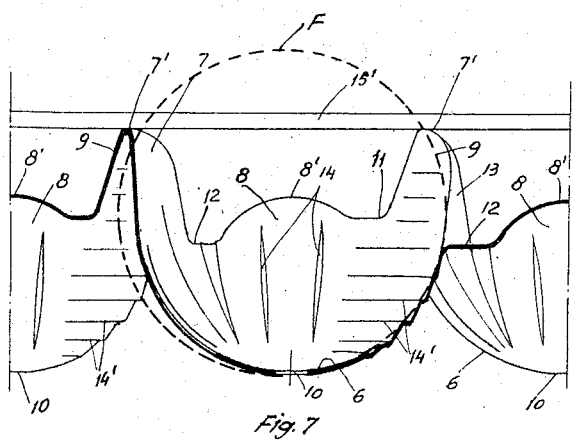
Figures 8, 9:
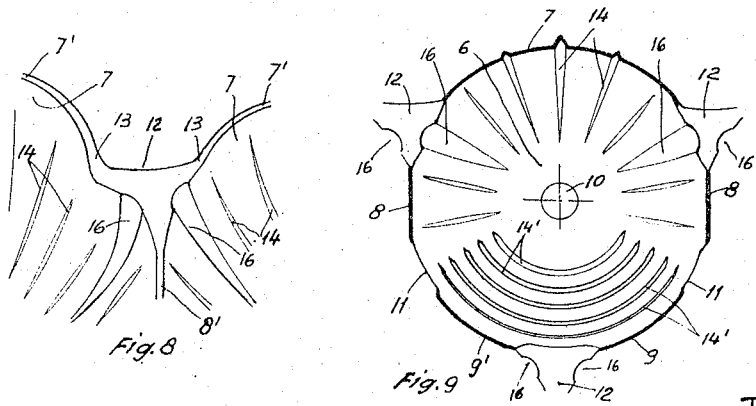

In order to explain further the details of the invention, its purposes and advantages examples will now be described with reference to the accompanying drawings, in which:

FIG. 1 is a view of the tray from above,
FIG. 2 is a vertical section through three cavities in the tray taken along the line x—x in FIG. 1,
FIG. 3 is a vertical section through three cavities, at right angles to the section in FIG. 2, taken along the line z—z in FIG. 1,
FIG. 4 is a horizontal section taken along the line y—y in FIG. 2,
FIG. 5 is a plan view of a modified embodiment of the tray,
FIG. 6 is a vertical section through three cavities of the FIG. 5 tray taken along the line x—x in FIG. 5,
FIG. 7 is a vertical section through three cavities, at right angles to the section x—x in FIG. 5 and to that in FIG. 6, taken along the line z—z in FIG. 5,
FIG. 8 is a diagrammatic perspective view of a lower portion of the wall between three offset cavities, and
FIG. 9 is a horizontal section taken along the line y—y in FIG. 6.

In the figures identical members bear the same references.

Each cavity has a base 6 in the form of a hollow spheroidal cap with a central hole 10 and as it rises therefrom spreads apart laterally in a conical shape to form the sections 7, 8, 9 and 9' of the side wall, which sectors are of different heights. The highest point in the sector 7 is slightly lower than the central diameter of the fruit to be placed in the cavity, while the highest point in the sector 8 is slightly higher than the radius of the fruit.

The sectors 7 and 8 end in an arcuate ridge 7' and 8' respectively. Whereas the sector 7 extends over about one-third of the side wall of the cavity and is curved outwardly in an arc each of the sectors 8 extends over about one-sixth of the side wall and is almost straight, though it has marked curvature in the zones adjoining the other sectors.

The sectors 7, 8, 9 and 9' of each cavity and the wall sectors—or portions thereof—of adjoining cavities are interconnected by the arcuate ridges 7' and 8' formed by folds during the production of the tray. They constitute partition members between the fruits in the tray and prevent these from coming into contact with one another in any way.

Towards the ends of their arcs, i.e. at the parts closer to the bottom of the cavity, the ridges 7' extend into inclines 13 and form lower, flat—preferably horizontal—almost triangular surfaces 12 linking three offset cavities. These lower surfaces or depressions each fill a gap left between three offset fruits. They thus take up none of the available surface, so that the tray according to the invention can hold just as many fruits as can be accommodated, wrapped in paper, in an offset arrangement in boxes without trays.

The surfaces 12 (see FIGS. 2 and 6) are below the centres of the fruits, which are approximately at the level of the line y—y. The depressions formed by the inclines 13 therefore make it easier to remove fruit from the cavities, since they replace the saddles of known trays but avoid the deficiencies of the latter.

In the tray shown in FIGS. 1 to 4—as can be seen particularly from FIGS. 2 and 4—the side walls of the cavities contain radial grooves 14 which all begin on the base 6 near the hole 10 and end before reaching the ridges 8' and 7' or the level thereof. They are of angular cross-section which is gradually enlarged towards their central zone. In this way they allow the cavity to be extended for insertion of the fruit. The cavity can be extended further in the region of the central zones of the grooves, thus providing a good fitting for fruit having an irregular surface. The grooves are particularly effective in preventing the fruit from rolling around inside the cavities, even in the case of round fruit with a fairly regular surface, since the widest portions are not all on one circular line.

As can be seen particularly from FIG. 1, a rim 15 is provided on all sides of the tray; it is preferably bent outwardly and upwardly and contains grooves parallel with the sides of the tray. The four corners of the rim 15 or of the tray are cut off at 16' to allow the tray to be fitted in wooden boxes having known corner reinforcements of triangular horizontal section.

Connecting surfaces are provided between the rim 15 and the edge reinforcements of the tray; these extend, like 17 and 19, at the level of the maximum height of the ridges 7' or, like 18, at the level of the surfaces 12 of the depressions.

The fruits F placed in the cavities in the tray are generally slightly larger than the periphery of the empty cavity. When such fruits are inserted they slightly stretch the cavity, particularly the sector 7 which is elastic in a peripheral direction—as shown in FIGS. 3 and 7. The inserted fruit is consequently enclosed on top to a certain extent and thus gains a very firm hold, so that it is not thrown out of the cavity even if the tray is violently shaken during transportation.

In order to make the sector 7 particularly flexible in a peripheral direction radial grooves 14 are provided therein.

The fruit is held in the cavities in the tray by pressure exerted by the side walls onto the upper half of the fruit over five places corresponding to the end zones of the wall portion lying on the fruit at the lower level of the ridges 7' and 8'. As a result the major part of the gripping action is assigned to the portions 7, 9, 9' of each individual cavity, for these portions enclose the greater part of the fruit.

In addition a fruit inserted into a cavity slides into the sector 7 of the side wall (see FIG. 3) which because of its spaciousness and the radial grooves 14 has greater flexibility than the sectors 8, 9 and 9' of the side wall. This produces a laterally sliding movement of the fruit F which prevents it from being shaken during transportation. In the tray according to the invention the vertical central axis of the fruit F (see FIG. 3 and FIG. 7) does not coincide with the vertical central axis of the empty cavity; shaking of the fruit is therefore prevented by the upper part of the sector 7 of the sidewall, into which the fruit is urged, and the fruit can be gripped very lightly and in a manner which is in any case harmless to ripe fruit.

The ridges 8' of the portions 8 are each connected by inclines 11 to the sector portions 9, 9' of two adjoining cavities. The inclines diverge from the portions to be joined and are of the same or a greater height than the zone of the largest latitude circle of the fruit.

The edge of the opening in each cavity has few, very short horizontal lines; in the drawing process this enables the material to flow towards the bottom of the cavity even if the sheeting is drawn pneumatically without the aid of material stretchers.

As the level surface of the depressions between the cavities certainly does not encourage the material to flow towards the bottom 6 of the cavity in question during the drawing process, the surface or depression 12 may be of limited size because of its depth.

To facilitate insertion and to increase the flexibility of the cavity in the stiff region of the surfaces or depressions 12 relatively wide grooves 16 (see FIG. 8) extend from the latter and taper out gradually towards the bottom 6.

The special shape which can be given to the opening in the cavity and to the surface 12 as compared with conventional trays makes it possible to use thinner sheets, in view of the ease with which the material can flow towards the bottom of the cavities in the drawing process.

If the cavities are offset the ridges 8' are arranged parallel.

The embodiment in FIGS. 5 to 9 differs from that shown in FIGS. 1 to 4 substantially only in that the cavities have radial grooves 14 on one side and centric grooves 14' on the other side. This arrangement prevents the fruit from rolling either about a vertical or about a horizontal axis during transportation. The fruit is given a particularly firm hold in the cavities.

Radial grooves 16 with their maximum depth at the level of the surfaces 12 increases the flexibility of the sectors 7 of the side wall by allowing the fruit to slide further in sideways, whereas the centric grooves 14' and the lack of any groove like the groove 16 between them makes the sectors 9 and 9' of the side wall less flexible.

The tray in the embodiment shown in FIGS. 5 to 9 has an end rim 15' which is narrower than the rim 15 in FIGS. 1 to 4. The rim 15' contains no grooves and extends upwardly slightly obliquely.

Although the trays described are intended primarily for transporting fruit in boxes, smaller trays according to the invention may also be designed to hold a small number of fruits for use in trade and selling as so-called "self-service trays."

I claim:
1. A multi-cavity packing tray of thin sheeting for fruit or round articles comprising, rows of cup-like cavities alternately aranged in adjacent rows, a portion of the wall of each cavity being integrally joined to a portion of the wall of each of at least three adjacent cavities along an arcuately curved folded edge, said cavities having centers lying in a common plane, the vertices of said arcuately curved folded edges lying in at least two different planes, webs at the juncture of three cavities joining the lower ends of three adjacent arcuate folded edges, said webs lying below said planes and providing finger receiving openings in the wall of the cavities for removing an article positioned therein.

2. A tray according to claim 1, in which grooves are provided in the walls of the cavities to provide for expansion thereof.

3. A tray according to claim 2, wherein said grooves are radially arranged with respect to the center of the bottom of the cavity.

4. A tray according to claim 2, wherein said grooves are concentrically arranged with respect to the center of the bottom of the cavity.

5. A multi-cavity packing tray of thin flexible sheeting for fruit or round objects comprising rows of cup-like cavities alternately arranged in adjacent rows, a portion of the wall of each cavity of the inner rows being integrally joined to a portion of the wall of each of six adjacent cavities along an arcuately curved folded edge defining three pairs of opposed folded edges, said cavities having centers lying in a common plane, the vertices of said arcuately curved folded edges of said pairs lying in at least two different planes, substantially triangular webs at the juncture of three cavities joining the lower ends of three adjacent arcuate folded edges, said webs lying in a plane below said planes and providing finger receiving openings in the wall of the cavities.

6. A tray according to claim 5, in which one of said pairs of said opposed arcuate folded edges have their vertices in substantially said common plane, and the vertices of the other arcuate folded edges lie in a plane thereabove.

7. In combination a multi-cavity packing tray of thin sheeting, rounded articles in said cavities, said tray comprising rows of cavities alternately arranged in adjacent rows, a portion of the wall of each cavity being integrally joined to a portion of the wall of each of at least three adjacent cavities along an arcuately curved folded edge, the centers of said rounded articles lying substantially in a common plane, the vertices of said arcuately curved folded edges lying in at least two different planes above said common plane, webs at the juncture of three cavities joining the lower ends of the three adjacent arcuate folded edges, said webs lying below said planes and providing finger receiving openings in the wall of the cavities for removing the rounded articles therefrom.

References Cited by the Examiner

UNITED STATES PATENTS

| | | | |
|---|---|---|---|
| 1,701,632 | 2/1929 | Oxhandler | 217—27 |
| 2,023,518 | 12/1935 | Degemeyer | 217—26.5 |
| 2,838,226 | 6/1958 | Hartmann et al. | 229—2.5 |
| 2,885,136 | 5/1959 | Grant | 229—2.5 |
| 3,049,259 | 8/1962 | Mazzi et al. | 229—2.5 |
| 3,074,582 | 1/1963 | Martelli et al. | 229—2.5 |
| 3,131,846 | 5/1964 | Whiteford | 229—2.5 |
| 3,171,562 | 3/1965 | Weiss | 229—2.5 |

FOREIGN PATENTS

| | | |
|---|---|---|
| 485,501 | 5/1938 | Great Britain. |
| 849,180 | 9/1960 | Great Britain. |

THERON E. CONDON, *Primary Examiner.*

RAPHAEL H. SCHWARTZ, *Examiner.*